United States Patent [19]

Chika

[11] 3,997,209

[45] Dec. 14, 1976

[54] COLLISION DEFLECTING SYSTEM FOR FAST MOVING VEHICLES

[76] Inventor: John J. Chika, 1350 Orchard Ridge Road, Bloomfield Hills, Mich. 48013

[22] Filed: Feb. 8, 1972

[21] Appl. No.: 224,415

[52] U.S. Cl. .................................. 293/72; 293/73; 293/89
[51] Int. Cl.² ......................................... B60R 19/04
[58] Field of Search ..................... 293/72, 73, 89

[56] References Cited

UNITED STATES PATENTS

| 2,508,836 | 5/1950 | Morris | 293/73 |
|---|---|---|---|
| 2,519,429 | 8/1950 | Brandvold | 293/89 |
| 2,603,517 | 7/1952 | Zitarosa | 293/73 |
| 2,840,411 | 6/1958 | Mason | 293/72 |
| 2,984,512 | 5/1961 | Shaginaw | 293/73 |

*Primary Examiner*—Robert W. Saifer

[57] ABSTRACT

Collision deflecting system for fast moving vehicles comprising extendible and retractable bumper-like assembly of rigid, elongated members pivotally operatively and adjustably connected together and to the rigid structure of said vehicle, said system provided at its outward apex with novel directional deflection triggering sensor system which commits even the apparent "head-on" collision into an oblique impact, and on its periphery provided with "roller" or "skid" type impact deflecting means to continue and expand the deflection into greater obliqueness, the system adapted to front and back installation, and operable and controllable by any conveniently available means, of power actuation and remote control and further providing added collision protection in oblique and "broad-side" collisions to the vehicle by installation of the same type and properly modified roller and skid type means at all desirable locations of the reinforced vehicle exterior surfaces.

36 Claims, 25 Drawing Figures

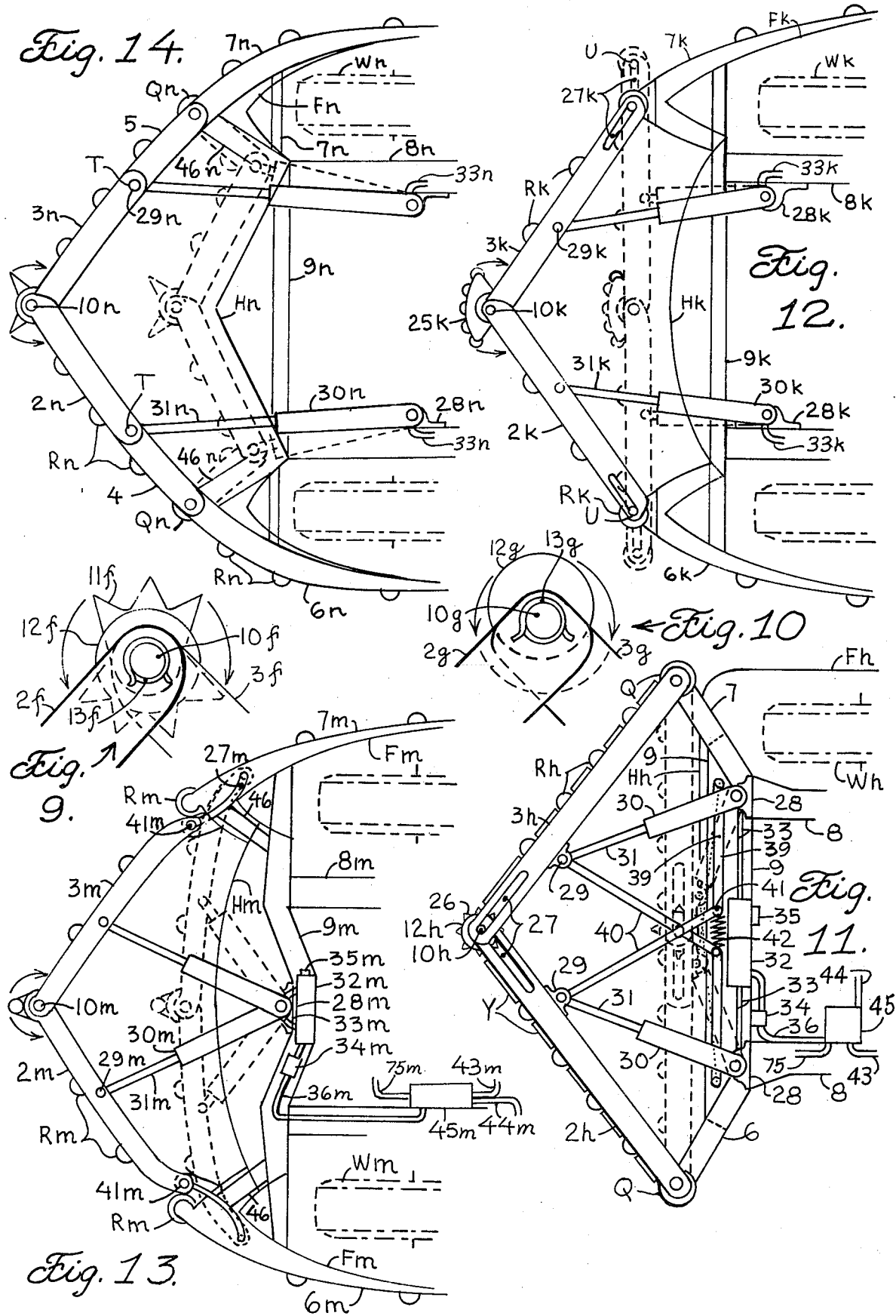

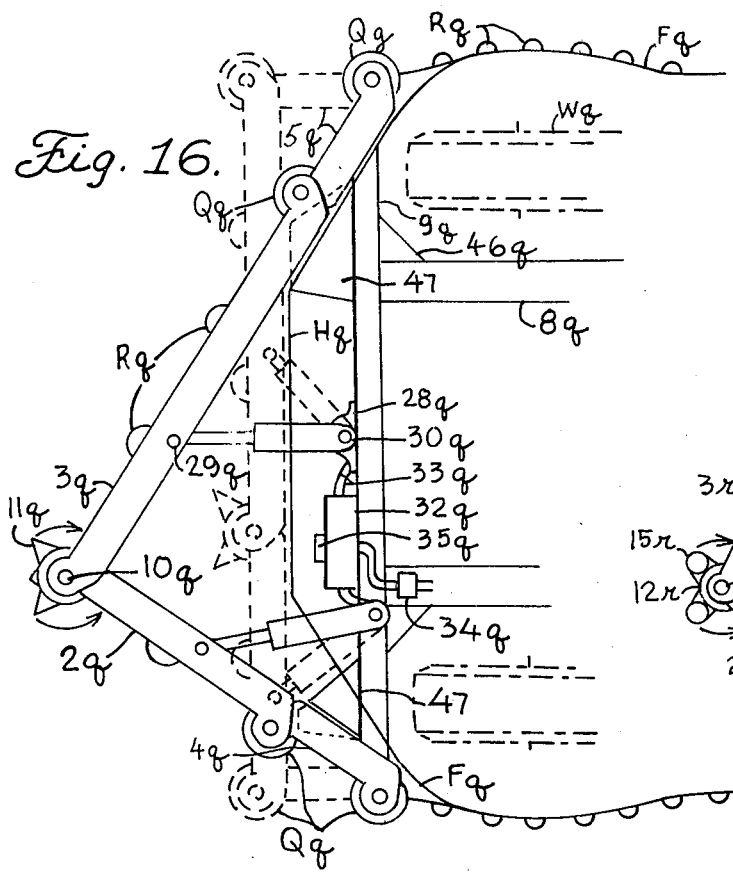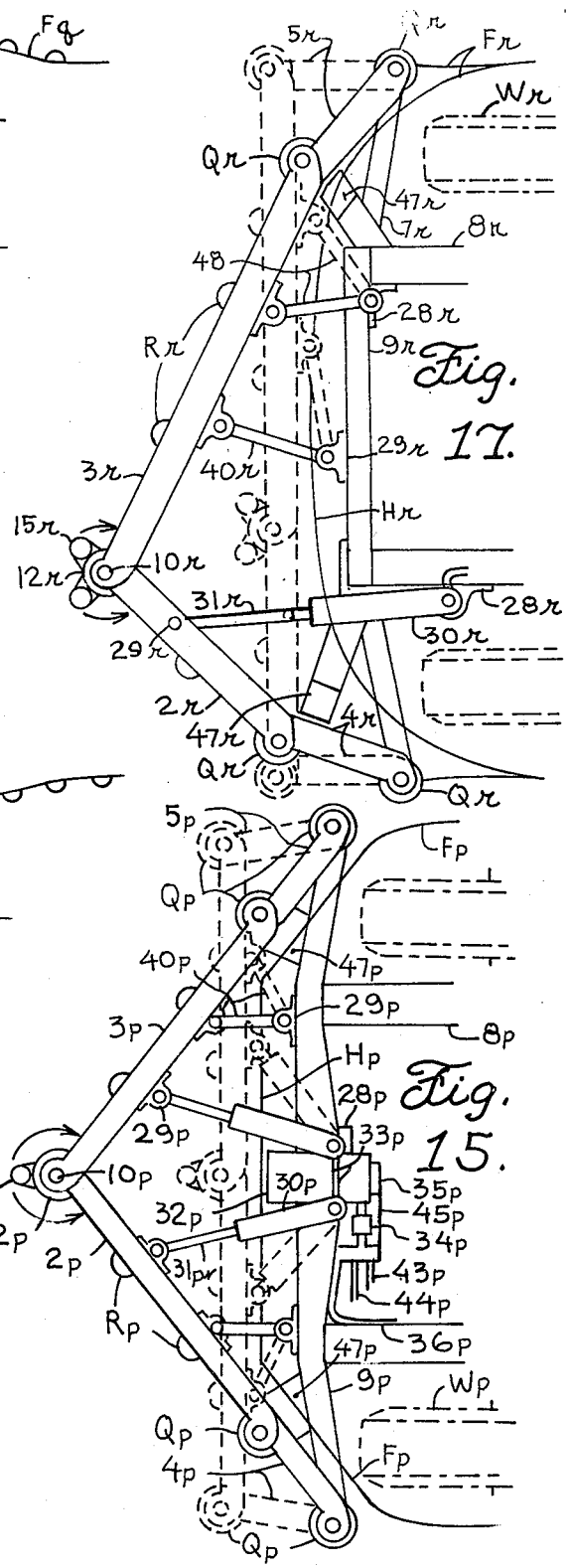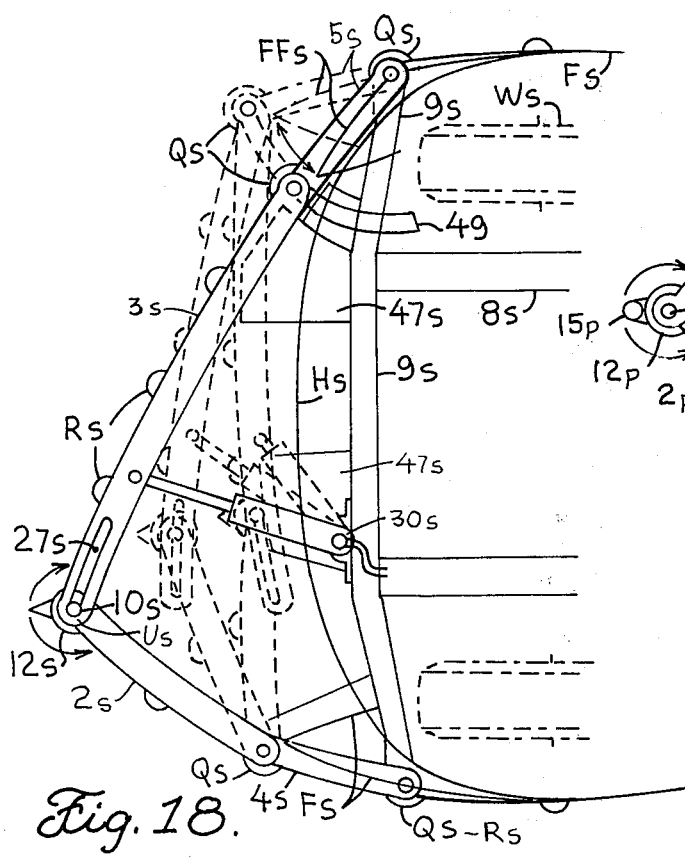

COLLISION DEFLECTING SYSTEM FOR FAST MOVING VEHICLES

BACKGROUND OF THE INVENTION

Because the basic function of automotive bumpers has been disregarded by stylists, designers, engineers and auto producers for years, so that today it serves only as a cosmetic item to give the auto only its "character and individuality", we are faced by the dreadfull spiraling of insurance costs, repair bills, property damage suits and injuries or deaths every time the auto is involved in a collision.

Locomotives had "cow-catchers"; when the automobile ceased to be a "rich man's toy", they put on the "bumpers" to "bump" aside whatever got in the way; but today, when the speed and the density of traffic is increasing to ever higher accident frequency levels, new solutions are needed.

Just like a boxer never wins by simply standing and "taking it on the chin", but by avoiding the punch, by ducking and deflecting the blow, this invention is conceived on the philosophy of minimizing the full impact of any collision by deflecting the blow of the impact, by glancing off the encountered object and "rolling with the punch", and presenting as smooth and hard contact surface as possible when deflection of the blow is impossible. The paramount object of this invention is to sacrifice the replaceable vehicle in order to save human suffering and life by:

1. Avoiding head-on collisions by deflecting them into oblique contacts, and maintaining or increasing the deflection until the vehicle passes the colliding object.
2. Avoiding penetration of not only the passenger compartment, but all of the body shell—because the exposed wheel openings alone comprise 25% to 40% of the vehicle side periphery that is at the bumper level, which means 25% to 40% less possible side protection.
3. By prolonging the time of deceleration between the initial contact and zero deceleration, thus reducing the "G" load that the human torso is subjected to.
4. By prolonging the distance that the vehicle travels between the beginning and the end of deceleration, because prolonging the distance slows the rate of deceleration and thus lowers the G load imposed on the vehicle occupants torsoes.
5. In short, trading the damage or destruction of the vehicle for the injuries or deaths of its occupants.

SUMMARY OF THE INVENTION

This invention relates to means of designing a car that will be able to "take care of itself" if it ever gets involved in any collision. While it may be styled and restyled to meet the rules of "artificial obsolescence", and will be no longer than existing vehicles, when it is driven over preselected speed, its front and rear deflectors will automatically extend, changing in their plan view configuration from transverse to triangular and stay extended until the vehicle is stopped and a special switch is actuated; these deflectors comprising roller and skid type means to convert any collision into oblique glide, slide or skid-roll off the contacted object. Furthermore, the reinforced intrusion-resistant panels extend on both sides of the vehicle body, with removable sections over the wheel openings, and are provided with novel roller means or unique skid panels which will peel off under severe impact; these means may be used in combination as desired and will greatly reduce the gravity of possible injuries to the vehicle occupants in most types of side collisions.

To convert this invention into really economical configuration, this deflective system may be manually operated, by simply modifying the pivotal shafts of the assembly to modified bolts with nuts whereby the system may be loosened, manually adjusted to any desired angular configuration and then made rigid by tightening said nuts at all required points; the system could be left in the desired degree of extention until such time when a question of parking, garage storage or other conditions would demand its retraction, but with compact vehicles this would be rarely necessary. Car owners living away from congested metropolitan areas and without local parking problems could purchase the hand-actuated system and really save money on its original cost, its operating, maintenance and repair expences. There are many intermediate configurations possible, such as adding to the hand-extendible system a plurality of regular automotive type shock absorbers to provide shock absorbency and cushion at the time of any unwanted impact against the system.

Other advantages of my invention will become apparent upon consideration of the present disclosure in more detail with reference to the accompanying drawings:

BRIEF DESCRIPTION OF THE DRAWINGS

FIG. 1 is a perspective view of a typical automobile constructed according to my invention, as it would appear with its deflectors retracted;

FIG. 2 is a fractional perspective view of the same vehicle with its deflectors extended;

FIGS. 3, 4, 5, 6, 7, 8, 9 and 10 are diagrammatic fractional plan views showing several types of my directional deflection triggering sensor means, which are located at the apex of the extended deflector means;

FIGS. 11, 12, 13, 14, 15, 16, 17 and 18 are diagrammatic plan views showing some of the possible variations and modifications of my collision deflectors;

DESCRIPTION OF THE PREFERRED EMBODIMENTS

Figure 19:
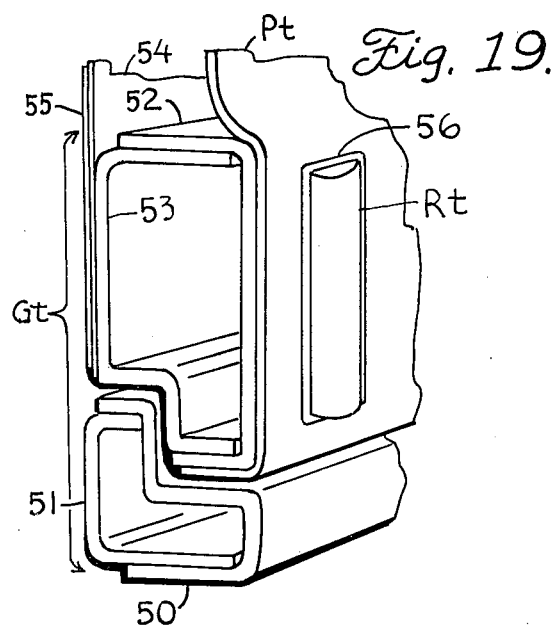
FIGS. 19, 20, 21, 22 and 23 explain in more detail the system of the novel roller-deflection means as disclosed in my patent.

FIG. 1 shows in a perspective view a typical automobile as it could appear when constructed according to this patent; it could be made just as acceptable to the public taste as any new, major model changes of recent past, but every novel modification would be based on sound reasons instead of the whim of stylists.

Referring to the drawing, the convential automobile A may have any style of body B, and may be of any size, weight, type and purpose—from the sub-compact two-seater to largest trucks. This invention is primarily concerned with the section of the body at the general area of the body guard G, extending all the way on both sides of the vehicle, from the front collision deflector D, around the front fender F, with removable front wheel covers C, and on through the door panels P and rear wheel covers CC and rear fenders FF to the rear deflector DD.

It would be very beneficial if a certain section of all highway using vehicles, let us say from 12 to 24 inches from the ground could be designated as the "common contact area"; most of existing bumpers are within this height range, and as more and more new vehicles would come equipped with this "buffer-zone" or "guard-rail", eventually all vehicles would contact each other in this reinforced area with minimum damage to each other, and of course, this would be the guard that would come into first contact with any colliding object because it would describe the broadest plan-view of the vehicle so equipped. The reason for covering the front and rear wheel openings is very obvious, for they represent the two biggest breaches in the whole defensive system of collision protection against the side impacts. Variations in esthetic appearance of my collision deflector system are endless; there could be one or more of the impact sensors S per unit, and the roller means could be of any angle of inclination to suit the overall design of the vehicle in question. Parking and stop lights, turn indicators and any other auxiliary accessory items could be incorporated into the deflectors as indicated by X, and the basic functional features could be either emphasized or subdued and camouflaged altogether; for example, the side roller means R could be either chromeplated or painted over to match the rest of the body finish, since they would not rotate under less than perhaps 400 inch-pounds oblique impact against them, and of course the skid plate means Y are undetectable, and could replace some of the rollers on the deflectors D, as well as all or some of the rollers on the side of the body. For the sake of appearance and individualized styling, the skid-plate panels would not have to be limited to the horizontal band as shown, but could be applied in any shape of panels dictated by stylists' caprice, even over some surfaces which would not be reinforced, but just to "conform" to the over-all "style feeling". Today we apply all types of ornamental "racing stripes" and trims to our cars, cover their roofs with vinyl, over the original paint; put vinyl wood-imitation panels over out station wagons; the skid plates disclosed in this invention could be applied in similar fashion, except that under any severe oblique pressure against them they would "peel off" or "slide" off their base surface like a glove and could be easily replaced when damaged. In a severe highway contact whole panels of it might be "stripped" by the impacted object, but it would enable the vehicle to slide and glance away instead of entangling itself at the slightest contact and wrapping itself about the struck object as todays vehicles are prone to do.

FIG. 2 is a perspective front view of the same vehicle as shown in FIG. 1, as it would appear with the collision deflector in extended position; the configuration shown in these two figures is further explained in FIG. 14.

FIGS. 3 through 10 illustrate some of the possible modifications of my directional deflection triggering sensor means, all of which tend to convert all but the most absolute zero degree impact into oblique deflection. Theoretically, the longitudinal center of gravity of a car should be through its plan-view center-line, but actually it is to the left or right of it, depending on the number, weight and seating arrangement of its occupants and other load factors such as luggage and fuel. If a car equipped with typical V-shaped bumper, as suggested by prior art, would be crashed head-on into a wall, it would fare no better than any car of conventional configuration.

One of the major objectives of this invention is to solve the deadly problem of head-on collisions by equipping its deflective system with the unique directional deflection-triggering sensor means which will assure that the car will always deflect to the right front fender, pivoting about it and impacting its right side against the struck object, thus allowing the driver's torso much more distance to zero deceleration and making even the most severe collision more survivable; and when we add the roller deflectors and the skid-plates configurations to the car system as disclosed in this invention, in majority of head-on collisions the deflected vehicle would slide on its right side against the impacted object for at least several feet, thus further increasing the time and distance to its zero deceleration and improving the chance of its occupants surviving it.

FIG. 3 shows very simple form of my impact sensor consisting of a modified cam means as 11 freely rotatable around the front pivotal shaft as 10, on which also rotates the front contact roller as 12. The cam 11 is kept pointed in preselected direction by return spring means as 13, which also returns the cam back to its original position after an impact in which it would be rotated left or right while deflecting the head-on collision.

When a vehicle equipped with my system collides even head-on into any solid barrier, the first contact is made by the forward point of the cam 11; this instantly triggers it to turn left or right at least 50 degrees as suggested by arrows before the impact is transferred to the surface of roller 12, and by then the collision assumes an oblique type of direction; and once the collision becomes oblique, the adjacent rollers in the deflector bar and the side body guard G will tend to continue the deflection process and to decrease the vehicle kinetic energy as they contact the struck barrier in quick succession. If the spring means as 13 would keep the cam 11 at the position of 11—11, a head-on impact would be automatically deflected into right oblique and into the front of right fender and around it into the right side collision so that the driver would have a better chance of survival, because the vehicle would deflect to the left from its line of travel. If the struck object would be a tree, a utility pole or any object of smaller diameter, and even if the initial contact occured between any of the rollers as R, skid-plates as Y applied to outwardly faces of said deflecting bumper would simply peel off under the impact, thus passing the impacted object to the adjacent roller R, then to the next skid-plates, and so on around the right front corner of the vehicle and continuing around its right side, until the car would come to a stop against said object or slide, skid or bounce from it; but it would not wrap itself around it and come to a dead stop, with the struck object imbeded deeply into the car body.

Thus, basically, each vehicle constructed according to this patent would carry its own guard-rail positioned at its widest plan-view contour, and augmented by the deflection sensor, rollers and skid-plates would be able to defend itself against any type of unwanted contact with any other object; and if any two thus equipped vehicles would collide with each other, they would just tend to slide and glance from each other instead of wrapping and entrapping themselves into each others body structures.

FIG. 4 shows the use of two modified cams as 11a, with their front lobes pointed at opposite angles from the longitudinal center line of the vehicle, thus providing even more critical type of impact sensor. Otherwise the design configuration and operating principle is very similar to the one described in FIG. 3.

FIG. 5 explains the use of another principle in modifying of my invention, wherein the triggering action is provided by free rotating roller means as 15 on shaft as 16, held in rotatable relationship around the front roller as 12b by plate means as 14 rotating freely around the shaft means as 10b; thus the roller as 15 can be the same length as 12b, presenting more contact with the colliding object and thus providing more positive action; and after the collision is deflected left or right by the roller 15, it is recessed out of the way as shown by the broken lines and the large roller as 12b assumes the load; and after the crisis the spring means as 13b return the sensor roller 15 to its original position.

FIG. 6 illustrates further modification of the above principle, in this case comprising larger roller means as 12c rotatable around shaft 16 held by means as 14c which are rotatable about the shaft 10c and controlled by spring means as 13c; one shear-pin hole as 20 is drilled in the longitudinal center line of means 14c, and the left center-arm deflector 2c, which is supporting the sensor assembly, has two same size holes drilled spacedly apart on the same radius as the shear-pin hole 20 in means 14c, so that the roller 12c may be locked in either left or right angular inclination to the longitudinal center line of the vehicle, and thus preselect to which side the vehicle will deflect in case of a head-on collision. Then, the shear pin as 21 would be sheared under severe impact and allow the roller 12c to turn to the position as indicated by the broken lines and deflect the impact; the shock absorbing means as 22 would cushion the shock of this instant swivel action; they could be configured of hard rubber pads or other qualified compression resisting material. Also, the end of arm 2c could be modified to provide circular surface as 23, over which the frictional sleeve as 24 would travel during the collision impact, and by increasing the radius of surface 23 as it approaches to the bottoming positon of roller 12c, a great amount of kinetic energy load could be dissipated. It is obvious that the shear-pin means as 20–21, the bumpers 22 and the functional means 23 and 24 are optional and may be used in any combination or ommitted if desired without jeopardizing the basic function of my invention, wherein the front roller as 12c not only triggers the deflection but continues to rotate in its deflected position, taking over the role of means as 12 in above figures, for the duration of its contact with the struck object. If line-x represents the direction of travel of the vehicle, and also the center-line of means as 14c, and the sensor would be preset at 20 degrees angle to the right, as indicated by the broken lines, in a head-on collision the roller means as 12c would swing to its right front fender and the vehicle would glide to the left of the struck object, ending with the center line x in position y, thus committing the vehicle into irreversible deflection to the right.

FIG. 7 describes another modification of the instant sensor means operatively similar to the one described in FIG. 6, with the following difference: the means as 14d are rigidly connected by shaft means as 17, which is slidably operable in a specially journalled housing with modified opening 18, configured to allow the said shaft 17 to operably slide back and forth and sideways in either direction; the spring as 13d keeps the shaft 17 in the front center of said opening 18 under normal conditions, but on severe contact with any colliding object, the moment the roller 12d is pressed on, the shaft 17 touches the point 19 in the opening 18 and is forced to slide either left or right, thus committing the vehicle to either left or right deflective maneuver.

FIG. 8 shows still another modification of my deflection triggering sensor device, wherein the housing means as 25 is adapted to rotate around shaft means as 10e, and is held in desired position by spring means as 13e, and on its curved, forward facing contour of its substantially triangular body are rotatably secured several smaller diameter roller means as 12e, with one of them at the longitudinal center-line of said housing 25, and with portion of them protruding substantially forwardly from said curved, forward facing side of said housing; thus, under normal conditions, the housing 25 would protrude well ahead of pin as 10e, and at the moment of impact, even if only the center roller 12e was contacted first, the whole assembly as 25 would swing left or right and commit the vehicle into deflected impact. The shock absorbing means as 22e would serve to absorb some of the shock.

FIG. 9 illustrates a modification of embodiment described in FIG. 3, except the modified cam as 11f has a plurality of peaks.

FIG. 10 is still another modification of FIG. 3, wherein the deflection triggering sensor consists of just a simple roller means as 12g, revolving on the shaft as 10g at an off-set from its actual center point, thus creating a cam action effect.

The above explained modifications of my deflection triggering sensor means are just eight of the very simplest possible variations submitted to illustrate the broadness of my invention without making it too cumbersome. For the same reason, I am listing only eight of many possible modifications of the deflector system itself; for there are innumerable ways to design the kinematics of it without departing from the scope of this invention; its geometry, its distribution and composition of various sub-assemblies and materials and elements employed; and its styling adaptations and production design potentials are limitless.

Therefore, all I can do is present a few major types of approach and solutions to the basic tenet of my invention, which is to design a deflecting system to do its job, without increasing the overall vehicle length when not used, to keep the price and weight to the minimum, to use the existing production facilities, and to keep the maintenance and inspection negligible. They are all retractable and extensible hydraulically, mechanically or manually, or they may be not movable at all, just built in any desired position, or be extensible in the front and unadjustable in the back, and with the choice of any of the sensor means.

FIG. 11 shows the simplest adaptation of my invention for a typical vehicle. Front fender Fh encloses wheels as Wh, and the frame side members as 8 are connected in the front by brace as 9. Extending angularily from frame 8 are two fender arm braces as 6 and 7, which are provided at their outboard ends with combination of pivot and roller means as Q, and to them are pivotally attached two main center deflector arms as 2h and 3h, which are joined at their inboard ends by means of slots as 27 accomodating the front pivot shaft means as 10h, allowing it to slide in slots 27 as required by the angular relationship between the two arms 2h and 3h; also on the said shaft means as 10h is rotatably mounted the deflection triggering sensor means as the cam-wheel roller 26, which is a simple modification of the one disclosed in more detail in FIG. 10. The hydraulic cylinders as 30 are secured to the frame brace as 9 by means as 28, and the piston rods 31 are secured by means as 29 to center arms 2h and 3h; the two cylinders are interconnected with lines as 33 for pressure equalization, and the accumulator tank as 32 with the burst-valve as 35 receives the hydraulic fluid displaced during the impact and returns the deflector to its extended position after the collision; the charging valve as 34 on the supply line as 36 and the control relay box as 45 is connected by means as 44 to the hand operated control on the instrument panel of the vehicle not shown, and the control means as 43 are attached to the transmission or any other speed sensitive means of the vehicle, not shown, while the main hydraulic supply line is indicated by 75. The supporting rods as 40 may be added; their rearward ends have slidable means as 41 operatively engaged with slots as 39 in the frame brace as 9, and the compression type spring means as 42 keep the rods 40 from possible chattering when the vehicle travels over rough roads and when they are extended.

Figure 24:
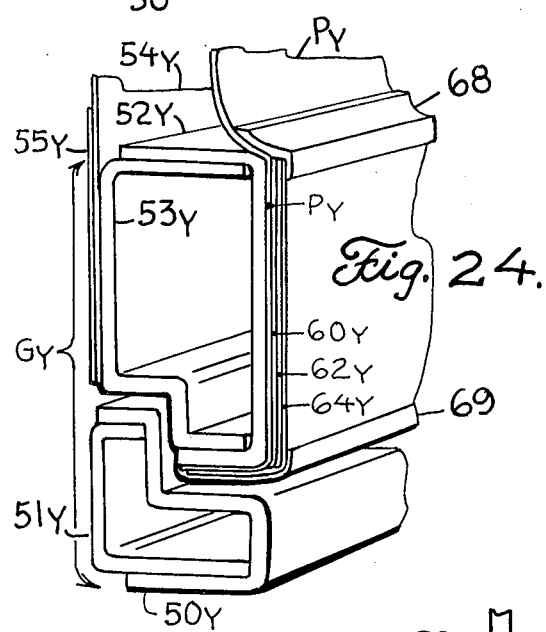
FIGS. 24 and 25 explain the basic principles of my "skid-plate" system of collision deflecting means.
Figure 25:
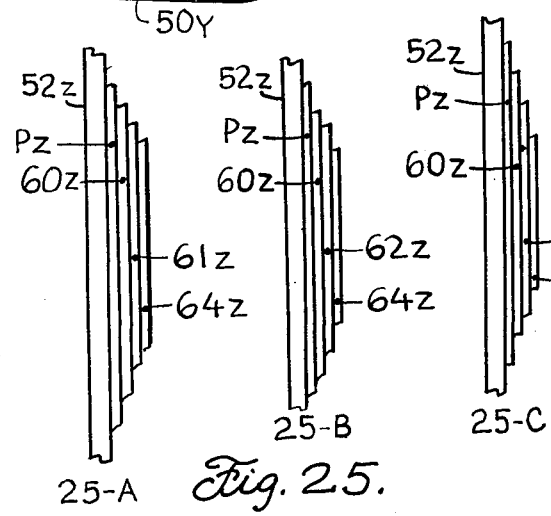

The deflector arms 2h and 3h have plurality of rollers as Rh mounted to them in such a way that their round section protrude substantially from the outwardly face of said arms, as explained in more detail in FIGS. 20, 21, 22 and 23, and if desired, the spaces between said rollers Rh may be provided with skid-panels as Y, described in more detail in FIGS. 24 and 25, and applied to those areas of said arms 2h and 3h which are most likely to come into violent contact with the impacted object. Thus, even if a small diameter object would be struck by this type of system, it would be instantly deflected to either of the outboard roller means as Q, which are located at the widest transverse dimension of the vehicle body.

This unique triangular principle of impact deflection and energy absorption works as follows: All of the energy applied to said arms as 2h and 3h by any violent frontal impact against them is either deflected to left or right side of the vehicle, or is transferred through points as Q into the rigid arms as 6 and 7, and through them into said frame as 8, which at this point is sufficiently reinforced by very rigid frame-brace means as 9, thus containing as much as possible of the total G load of the impact to this triangular structure, before it reaches the rest of the vehicle, with the hydraulic cylinders as 30–31 and various supporting rods as 40 further relieving the shock of a collision.

FIG. 12 illustrates another modification of my patent, wherein the rigid fender arms as 6k and 7k are incorporated into the exterior design of the overall vehicle bumper system, and comprise modified shaft means as U, slidably cooperating with slots as 27k which are in the outboard ends of center deflecting arms as 2k and 3k and also contain modified roller means as Rk, said arms united pivotally at their inboard juncture by pivot shaft as 10k, equipped with any of the sensor means as 25k. The hydraulic system consists of two cylinders as 30k, secured to the frame 8k by means as 28k, and the piston rods 31k pivotally secured to the center deflector arms as 2k and 3k by means as 29k.

This configuration softens the angularity of points as Q in FIG. 11, by blending the points as U into the contoured fender bumper sections 6k and 7k, thus creating smoother and more oblique deflecting contour. It is easily understood that this configuration of the system could be operated by the same means as described in FIG. 11, or the hydraulic means as 30k–31k could be simply connected by pipes as 33k to suitably modified hydraulic system operating said vehicles power steering and then, the vehicle operator would simply extend, adjust or retract the system as he desired, by control means within his easy reach, as is done with wind-shield wipers and other auto accessories; if desired, another control could show the existing pressure in the system and control means could be provided to regulate said pressure, thus allowing a choice of "soft" system for local driving, graduated to "hard" and finally to "unyealding" for expressways; the system could be "locked" at any pressure, or even this feature could be made more sophisticated by having the speedometer automatically controlling the pressure by proper means of sensors and electronic devices.

FIG. 13 illustrates another adaptation of my invention, wherein the two central deflector members as 2m and 3m are pivotally joined at their inboard ends by shaft means as 10m, and their outboard ends are provided with modified shafts as 41m to slidably engage with specially modified slot means as 27m, which are secured to modified rigid fender arms 6m and 7m of the vehicle structure by means as frame braces 9m and auxiliary braces as 46 attached to the vehicle frame structure as 8m. The hydraulic system is of the unitized type, containing in its basic assembly hydraulic cylinders 30m, mounted on the common base as 28m, with cylinder rods 31m attached to the central deflector arms as 2m and 3m, with accumulator means as 32m, equipped with burst disc means as 35m and interconnecting lines as 33m, the modified assembly served by charging valve as 34m, and the whole system controlled from relay means as 45m with the manual control means as 44m and the automatic control connections as 43m allowing the system to be controlled either automatically, or manually, or in any combination of the available means desired. One of many advantages of this configuration is that its compact hydraulic system could be easily mounted as one separate unit, thus providing ease of serviceability or replacement, and of course it also could be operated by any of the various means explained in FIGS. 11 and 12.

FIG. 14 illustrates one of the possible adaptations of this invention to vehicle bodies with pronounced plan-view fender and hood contours as sometimes used in styling of sport cars. My invention is very adaptable to any chosen configuration of shapes and contours; the pointed lines of fenders as Fn and the hood lines as Hn may be very closely matched if desired, by simply designing the fender wings as 6n and 7n to the desired contour, reinforcing them by such auxiliary braces as 46n, making the center deflector arms as 2n and 3n shorter, and adding two wing deflector arms as 4 and 5, which constitute adding two links to the system, and which are pivotally connected to the center arms 2n and 3n on one end and to forward ends of fender arms as 6n and 7n by either the shaft and roller combination means as Qn, or just the simple pivotal means as T, or in any combination of the two as desired. end and to forward ends of fender arms as 6n and 7n by either the shaft and roller combination means as Qn, or just the simple pivotal means as T, or in any combination of the two as desired. Also, the hydraulic system may be mounted back of the front axle of the vehicle, for better distribution of the kinetic energy under hard impact, as shown by mounts as 28n supporting cylinders as 30n, with piston rods 31n attached by means as 29n to the deflector arms 2n and 3n. As an example of how easily the system could be operated by hand, just five specially adapted bolt and nut means located at 10n, T and Qn points and tightened securely would lock even this double-jointed assembly into one rigid collision deflecting system in any desired degree of extension and, as explained in the description of FIGS. 11 and 12, the hydraulic cylinders could be replaced by modified automotive shock-absorbers. Another advantage of this configuration is its novel energy absorbing capacity, whereby major portion of the G load in a head-on collision would be transferred by the pivotal means as T into the hydraulic system as 30n–31n and into the frame of the vehicle substantially back of the front wheel axle line, thus minimizing the "nose-diving" and transferring some of the G load into the midsection of the vehicle frame structure.

FIG. 15 illustrates another modification of my patent in which the disposition of the deflector system members is designed to preserve the long looks of the vehicle when it is parked and at the same time to increase its angularity when extended without undully increasing its front overhang and its overall length. The wing deflectors as 4p and 5p are connected to center arms as 2p and 3p, and to the rigid frame cross member brace as 9p, by means of pivot-roller combinations as Qp; when the assembly is retracted, it assumes substantially rectangular geometry as shown by broken lines, and the wings 4p and 5p assume positions substantially parallel to the longitudinal center line of the vehicle, thus providing good protection for the vehicle corners when parked, and also enhancing the look of "long overhang"; but when extended, the wing deflector arms as 4p and 5p pivot inboard from their pivotal anchors as Qp on the frame brace 9p and thus enhance the angularity of the assembly so that while the actual increase in said car's overhang is let us say 16 inches, the longitudinal distance between points 10p and Qp is 32 inches. The hydraulic system shown is similar to the one described in FIG. 13, and the whole system is packaged into one compact unit; also the two arms as 40p and the bumper means as 47p may be added for extra rigidity and shock absorption, thus creating 5 bracing points for each of the deflector sides: first at the front apex as at 10p, second where the hydraulic rod as 31p is mounted to it, third where the supporting arm as 40p is attached, fourth where the assembly rests against the bumper cushion means as 47p and the fifth at the outboard pivot as Qp. It is easy to see how any number of shock absorbing means similar to 40p and 47p could be incorporated into all of the disclosed configurations of this invention.

FIG. 16 illustrates another major modification of my patent, wherein the two center deflector arms as 2c and 3c are of unequal lengths, and when extended, their center juncture point is located substantially outboard from the longitudinal center line of the vehicle. This arrangement provides for even more positive trigger action of the deflector assembly even in the zero degree impact, and the vehicle would positively, automatically deflect to the side with the longer center arm as 3q, transferring the G load of the impact into it and in case of this configuration, the vehicle would glance off to the left, thus saving the driver's side from the broadside contact with the impacted wall, and greatly increasing his chance of survival. Of course, in case of a "right-hand-drive" vehicle, the plan-view geometry of the assembly would be reversed. When it is considered that over 85% of highway travel is logged by the driver alone occupying the vehicle, this type of configuration may be the best one for majority of vehicles, and especially for sport cars and business and commercial vehicles. As shown in the drawing, the wing deflectors as 4q and 5q are pivotally attached at their back-outboard end to frame braces as 9q by means as Qq, and on their forward-inboard ends by similar means to back ends of the left center arm as 2q, which is shorter, and to the right center arm as 3q, which is longer; their inboard ends are pivotally joined by means as 10q, provided with any of the sensor means as 11q. The hydraulic cylinders as 30q function in similar fashion as explained in preceding figures, and to add more shock absorbtion for diagonal impacts, the resilient bumper means as 47 could be provided at strategic points, offering protection not only when the deflector assembly is extended, but also when it is bumped into while parked.

FIG. 17 shows another "off-center" configuration of my deflector system operated by only one cylinder combined with plurality of rigid auxiliary arms and suitable for ligher vehicles. While the center deflector arms as 2r and 3r, together with the wing deflectors 4r and 5r coact in similar fashion as explained in FIG. 16, only one hydraulic cylinder as 30r is used to actually extend and retract the deflector assembly, assisted by supporting bars as 40r and pivotal supporting means as 48, on which the assembly pivots when changing its plan view configuration; additional shock absorbing means as 47r complete the basic assembly. This type of configuration could be very easily converted into mechanical or electrical operation by replacing the hydraulic cylinder with electrically operated means to actuate the assembly; conversion to hand operation of the system would be just as simple.

The configuration assures to deflect even the absolute zero frontal impact into right side deflection and force the vehicle into left glide, because the single hydraulic means as 30r–31r, attached to the short arm as 2r leaves the longer arm as 3r purposely less resistant to frontal impact, thus assuring positive deflection of its right front corner and continuing it around to its right side.

To convert any of the disclosed configurations into electrically powered mechanical operation, all it would require is to replace the hydraulic assembly as 30r–31r with simple assembly of reversible electrical motor of the type used to operate car windows and seats to actuate circular rack-and-pinion gear means, wherein the circular rack would replace the cylinder rod as 31r, secured to 2r at 29r, and the housing with the pinion and motor would be mounted to the frame as 8r at 28r. The electrical motor would be used only to position the deflective assembly as desired, and then the system would be rigid, but without any hydraulic cushion means. It goes without saying that even the electrically actuated rack-and-pinion could be easily converted into hand operation, with a simple crank handle as used in some car-jacks to extend and retract it as desired. For real economy, and where only infrequent change in its geometry is required, all pivotal shafts would be in form of bolts, which would be loosened by hand, then the deflector readjusted as desired, and then by simply tightening all those bolts the assembly would become very rigid.

FIG. 18 illustrates still another possible configuration of my patent. It should be noted that in the previous FIGS. 11 to 17 the deflector assemblies were so designed that they harmonized with the contours of respective fenders and hoods; in this figure is presented just one of innumerable ways how even the vehicle body structure and adjacent sections of its exterior body surfaces and contours or trims may be modified and adapted to conform to the desired configurations and overall design concept of exterior body stylists. Given the contour of fenders as Fs and the hood Hs, we want to keep the overhang of the extended deflectors to the minimum, while providing the maximum length and sweep of the deflective surface and its protection possible; in this case let us follow the off-center pattern, wherein the left wing arm as 4s is anchored to the frame brace as 9s by means as Rs or Qs as preferred, and on its front it is pivotally attached to the shorter center arm as 2s by means as Qs; the front end of 2s is provided with pivot means as Us to operatively, slidably engage with slot means as 27s provided in the front part of the longer center arm as 3s, which in turn is attached by means as Qs to the right wing arm 5s, and through it to the frame brace as 9s by means as Qs. Now while the front of the left fender Fs is rigid and unyealding, the front of the right fender as FFs is adapted to swing inboard to follow the contour of the wing arm 5s when the deflector assembly is in extended position.

This is accomplished very simply by securing the forward portion FFs of the fender Fs to the short section 5s of the deflective assembly, so that the two will move in unison (as some headlights swing open and shut); the broken line indicates how much of the corner would be thus "rounded off" and how this would facilitate deflection of the vehicle around its right fender. It is understood that this configuration could be reversed for adaptation to the left front fender. Of course, this type of modification is endless, and it could be employed at all sections of the vehicle body affected by the stylists prerogative on one hand and the hard facts of reality on the other. Only one hydraulic cylinder as 30s is employed, and it is assisted by telescopic type of supporting means as 49 and bumper means as 47s. One set of broken lines indicate the assembly fully retracted, when both fenders would look symmetrical, while the forward set of broken lines shows the system only partially extended, for "two-stage" system; the mid-extension used for the "neighborhood" speeds up to 30 miles or less.

All of the collision deflecting configurations disclosed in this patent are adaptable to varied degrees of sophistication and price range. For an opulent society fully automatic operation could be provided; the car would have its deflectors normally retracted, thus creating no problem in its owner's garage, but when it would reach preselected forward speed of let us say 10 miles per hour, both bumper-deflectors would automatically start extending, higher the speed, greater the extension, until at 35 miles speed they would be fully extended, and after that the hydraulic pressure in the system would be increased as the forward speed would increase, and after reaching let us say 50 miles, the system would become as rigid as the structure of the vehicle itself; the system would automatically retract when the ignition would be turned off, or it could be retracted by the operator.

On the other extreme is a simple, hand-actuated configuration which would be just as effective in its collision deflecting capacity, but far more economical to purchase, without expence for its operation, maintenance and upkeep. Simply stated, the electronic speed sensors, relays, hydraulic pumps and cylinders and all other expensive and sophisticated apparatus would be eliminated; cylinders as 30–31 could be replaced by regular automotive shock-absorbers modified for the job, or even those could be eliminated; the combination pivot shafts as 10 and all others as U, T and Q, as well as the bolts at 28 and 29 would be modified to comprise bolts-and-nut means which, when loosened up would allow manual actuation of the system to any desired configuration, and when tightened all around, the assembly would become very rigid and would ride without any rattles; thus, an owner of a compact car or not plagued by parking problems could leave the assembly extended all the time.

In-between these two perhaps extreme modifications of my patent are innumerable options and combinations of various characteristics that are possible and may be desirable; few of them have been described in a way of illustrating the broad adaptability of this unique approach to collision avoidance and resistance.

Also the whole deflective bumper assembly could be built in its extended configuration right at the factory, not retractable at all, and be treated as a regular rigid bumper of today, but with all the advantages of the directional deflection-triggering sensor means, roller-type deflectors and skid-plates all built-in, and again, with or without the shock-absorber means.

It is obvious that there is no limit to all possible variations of this system while still remaining within the basic spirit and scope of the unique concept of this invention.

FIGS. 19 and 24 illustrate two of many possible configurations of the "contact zone" disclosed in this patent. As explained in the description of FIG. 1, a vehicle constructed in accordance with this invention would have on its sides a "common contact area" of approximately 12 inches width, in the general area of prevailing bumper heights; as shown in FIGS. 19 and 24, this guard-rail would constitute the widest section of the vehicle, so that at any time of unwanted, violent contact of said car with other object or car, this "buffer zone" would take the brunt of such encounter.

FIG. 19 is a cross-sectional perspective view taken through typical door panel and the sill section of a vehicle constructed according to one of the modifications of this invention, showing one of the body intrusion prevention systems. The sill section comprises the heavy, modified channels as 50 and 51, welded to form a very rigid structure; the bottom of the door has similarily constructed box section comprising heavy channel sections as 52 and 53, also welded together and containing other sundry means for energy absorbtion; thus the sill and the lower section of the door panel would provide very rigid zone Gt not only for the passenger compartment, but with proper modifications for the whole body shell, from the front deflector to the rear deflector, as indicated in FIG. 1. The exterior door panel Pt and the interior door panel as 54 with its trim panel as 55 comprise the major components of this configuration, with the roller means as Rt sealed by means as 56 being explained in greater detail in FIG. 20.

Figure 20:
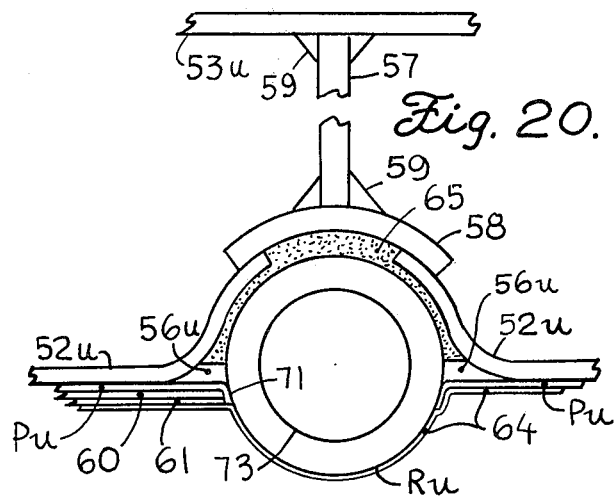

FIG. 20 is a fractional cross-sectional view showing in more detail one of the possible ways of installing the roller means as Ru in a reinforced body section such as shown in FIG. 19. The channel section as 52u is stamped to accomodate a portion of the roller Ru, and if necessary to be pierced, the resulting opening would be covered by the buffer and sealer combination plate as 58, to which is welded by means as 59 the roller-housing brace as 57, which reaches and is welded to the back channel section as 53u. The roller means as Ru may be of any proper substance, either solid or hollow with its ends plugged by means as 73; the sheet metal as Pu is die-cut smaller and opened to allow insertion of the roller Ru through it into its housing, and when the vehicle is being assembled, the roller housing is packed with proper type of permanent lubricant as 65, and if needed, after the roller is inserted into its lubricated housing, a bead of viscous type of formed-in-place gasket material as 56u is applied around the protruding roller, and then the sheet metal Pu is bent back on the roller Ru, forming a retaining flange as 71 around it. Then the whole assembly may be painted over or finished by any means as 64 and forgotten; it will not rattle, there is no maintenance to it and the flanges 71 will not allow it to rotate unless under pressure of several hundred pounds; thus it may be treated the same as the rest of the vehicle exterior. This system of providing collision deflecting means to the side of any vehicle would be very simple, economical, easily inspectable and trouble-free, so it could be forgotten unless the vehicle is involved in an accident. When the roller Ru is hit by any colliding object, the seal of the gasket as 56u will break and the roller will be free to rotate in its lubricated housing, and thus help to deflect any oblique impact on it.

This type or roller configuration could be easily adapted to installations where the inner wall as 53 is several inches from the outside wall as 52.

Figure 21:
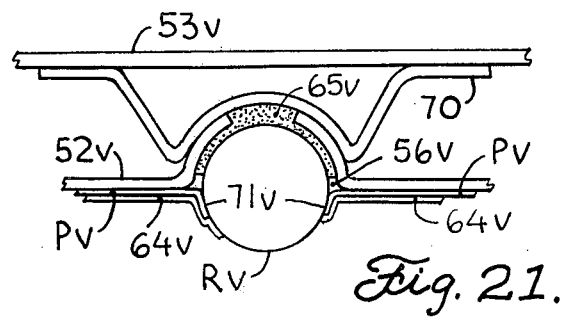

FIG. 21 shows another way of providing support for the roller means as Rv, when the distance between channels as 53v and 52v allows it; the supporting bracket as 70 is welded to the inboard side of channel 52v to provide support for the roller housing and retainer for the lubricant as 65v, and its back flanges are welded to the channel 53v; the roller seal as 56v is optional, and the rollers Rv could be chromeplated, thus not requiring refinishing after minor collisions.

Figure 22:
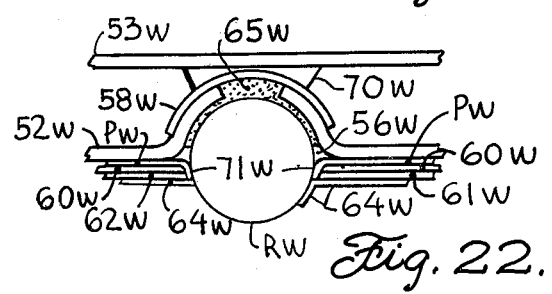

FIG. 22 shows still another adaptation of my roller deflector means as used in cases where channels as 52w and 53w are quite close together, as when spanning the wheel openings of a vehicle. Again, the outside channel as 52w is formed to provide a housing which is spanned on the inner side by the buffer-sealer as 58w braced by means as 70w. Otherwise this configuration is similar to the one described in FIG. 21.

Figure 23:
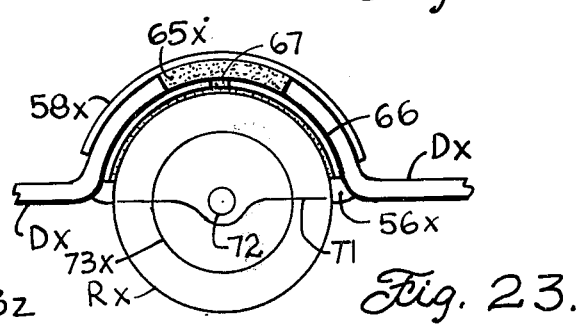

FIG. 23 illustrates the roller means as Rx being adapted for installation in front and rear modifications of my collision deflector systems. The heavy-gauge bumper-stock deflector as Dx is formed to make a partial housing for the roller means as Rx, also allowing for the bushing as 66 of nylon or other suitable material if a "dry" bearing is to be used; but if a lubricant as 65x is used, then the reinforcing buffer and sealer retainer plate as 58x is welded to the back of Dx, in which case the bushing as 66 could be eliminated or at least provided with an opening as 67 to allow for the lubricant as 65x to circulate. The gasket seal as 56x, made of such material as silicone or other suitable substance would keep the lubricant 65x from drying up, and the whole system carefree until a collision contact with it would break the seal. The roller means as Rx would be preferably of very rigid steel tubing, chrome plated to match the rest of the deflector assembly, and just for holding purposes, the top and bottom flanges of the Dx deflector would be modified as at line 71 to allow locating pin or bolt means as 72, which would shear under severe pressure, to be fitted into the center of end plugs as 73x of the roller Rx. Thus, the heavy rollers would be kept from rattling or shaking loose from their housings, and rotate only under severe pressure.

If the heavy steel plate used in 52, 52u, 52v, 52w and Dx could be fabricated to provide satisfactory concave configuration to accept its rollers as R without the necessity of piercing it, the enlarged portion of the grease chamber holding the lubricant as 65 could be dispensed with and the plate as 58 could be omitted; also, just a nylon bushing as 66 could be used if sufficient to prevent the chrome-plated surface of rollers as R from rusting together with means as 52 or Dx into one unyealding mass after several years of weather exposure; thus, the paramount objective is to provide a roller means as R which will have sufficient strength to withstand the collision impact, and to insure that it will rotate under any severe oblique pressure against it during the life span of the vehicle, and if it takes a grease fitting at each roller location to keep it pressure-lubricated, let it be so; thus the rollers would be "greased" and checked every time the vehicle itself is lubricated.

FIG. 24 is very similar to the one described in FIG. 19, except that the roller deflector Rt is replaced by novel "skid plates" which constitute one of the major parts of this invention. As shown in its basic configuration, the channel section 52y is covered by sheet metal as Py; a sufficient coating of specially compounded coating as 60y is applied over the reinforced area of the vehicle, and over any other sections which are to be protected by the skid-plate system. The 60y coating is a special mixture of long lasting lubricants and never drying adhesives which will retain its qualities for the life of the vehicle; on top of this coating is placed a sheet of suitable synthetic material such as vinyl, smoothed out and finished the same way as the rest of the vehicle body exterior. Under severe pressure of an oblique collision impact, the vinyl sheet, when contacted under pressure, will slide and "peel off" on the coating 60y, leaving the lubricated area exposed and very slippery. The retaining moldings as 68 and 69 would keep the skid plates in neat trim and prevent the coating as 60y from oozing out under abnormal climatic conditions. Also, it would be applied at the factory, painted over and forgotten, unless involved in a collision.

It should be understood that the two disclosures illustrated in FIGS. 19 and 24 may be used in any desired combination, so that a vehicle could have 12 rollers per side as shown in FIG. 1, or just a few to protect the passenger capsule, without any skid-plates or just skid-plates without rollers as indicated in FIG. 24; but of course the ideal combination would be to have let us say 12 rollers per side and all spaces between them provided with skid-plates, so that even if the vehicle skids sideways into a 10-inch utility pole right between any two rollers, the impact would be instantly deflected by the "peeling" of the impacted skid-plate to the nearest roller, and continued on; if the vehicle side would be protected by skid-plates alone, then several of them might be peeled-off from the side as the struck object would be deflected and passed by.

The skid-plate replacement and repairing equipment would become a stock item in auto repair shops for general use on cars thus protected so that they could be repaired in the same fashion ordinary vehicles and refinished the same way. Thus, this system of the vehicle crash-resistance and impact-deflecting ability could be tailored to any pocket-book of its buyer, and to suit his "safety concept"; and stylists could forever "dream-up" various "tricky" combinations of this system, to "individualize" their creations; for example, the trim moldings as 68 could be touted as a "chrome accent", a soft "trim molding" to protect the door and body finish, or could be of a section making it very inconspicuous, especially when finished to match the body color; and when its prerequisite technological qualifications would be satisfactorily developed, the skid-plates could be applied to the car exterior surfaces in similar fashion as the sundry "racing trims", vinyl roof covers and vinyl "wood-grain" panels are applied today to station-wagons, to be accepted as part of the trim-package and the retaining moldings as 68 could be completely eliminated.

FIg. 25 shows in a diagrammatic way three of many possible ways of producing a satisfactory skidplate system that will meet all the requirements. The 25-A diagram shows a rigid type of material as 61z, used as the skidplate; it could be of any substance, even a rigid type of plastic material with the required characteristics, and when used to cover areas of front and rear deflectors, alone or in conjunction with the roller type means, it could be molded to conform to any shape required, and if made of the clear type plastic it could be vacuum plated to match the surrounding chrome plated areas, and the finishing coat as 64z would not be needed.

When applied to any reinforced exterior body sheet metal as Pz, covering in this instance rigid type channel means as 52z, a combination adhesive-lubricant as 60z is used to hold the skid-plate as 61z in such manner whereby it will withstand the everyday abuse of weather elements, wear and tear of daily driving and all other minor hazards for the life of the vehicle, while at all times, under any severe oblique impact against it, it will slide and separate from said sheet metal as Pz and will even slide and peel off completely from its base if it should become impaled to the colliding object.

The 25-B diagramm suggests the use of any proper type of "film" material of proper thickness, which could be applied at the factory before the painting and then finished in the same manner as the rest of the body exterior. The sequence of application could be as follows: the area desired to be protected would be covered by the special adhesive-lubricant as 60z, the vinyl film as 62z would be applied to it and after proper smoothing, trimming and drying it would be primed, painted and polished as the rest of the car.

The 25-C diagramm suggests a sequence of applied coatings to "build up" the skidplate directly to the desired surface of the vehicle body in the following manner and sequence: the coating as 60z could be of two separate applications, consisting of compatible adhesive on the metal of Pz, followed by the 60z lubricant, or the two could be combined into one material; then the protective coating of hard-finish, durable film such as fiberglass would be built up so it could be finished with the rest of the vehicle exterior and forgotten.

It should be understood that there is an endless variety of possible combinations, shapes, contours and materials used, means of securing them and adapting them to the existing or emerging requirements, and that this system of collision deflection and resistance may be applied to protect any other type of a fast-moving vehicle which may be subjected to any unwanted and violent contact with any other moving or stationary object, and that the embodiments shown are given by way of example only and not in a limiting sense.

It will be recognized that any other types of electric, hydraulic, vacuum, hand and other mechanical means of operation not presently disclosed, described or illustrated could all be used in combination or alone in the various preferred embodiments disclosed, and that while such preferred embodiments are well calculated to fulfill the objects above stated, it will be appreciated that the invention is susceptible to further modification, variation and change without departing from the proper scope of fair meaning of the subjoined claims.

I claim:

1. A collision deflecting system for fast moving vehicles comprising in combination:

an extendible and retractable assembly of rigid, elongated, bumper-like collision deflecting members pivotally, operatively an adjustably connected together and to the rigid forwardly structural members of said vehicle in such manner whereby in their plan-view configuration they are normally disposed substantially transversely to the longitudinal center-line of said vehicle when retracted, but when extending to their deflective position, the outboard ends of said members pivot about their pivotal means of attachment to said rigid members of said vehicle structure, and their inboard ends, adjustably, pivotally and operably connected together, swing angularily outwardly and forwardly to assume an angular configuration protruding substantially forwardly of said vehicle, and comprising at the apex of said forwardly protruding pivotal connection:

a directional deflection-triggering sensor means protruding substantially therefrom, and so configured that it compells any frontal impact against it into an oblique impact against either of the two adjacent outboard-facing sides of said angularily configured deflective assembly;

a roller-type impact-deflecting means strategically located at a plurality of points along the outward-facing contours of said angularily positionable deflective assembly, and especially at its outboard apexes, said roller means protruding substantially outwardly from the outward contour of said assembly to sustain and increase said triggered deflection along said outward contour of said assembly and past said outboard apexes, and further comrising:

a plurality of unique skid-plate means comprising panels of composite materials configured in such manner that while they may be applied seemingly permanently to the outermost surfaces of said bumper-like assembly which are subject to come into any violent contact with the colliding object, they will, under any severe oblique impact against them, slide and peel off from whatever surface they are applied to; thus not only further sustaining and increasing any deflection transferred onto them by said deflection triggering means and said roller-type deflectors, but also compelling into deflection any violent, oblique impact against them by any object at any point intermediate any two of said adjacent roller-type impact deflecting means.

2. A collision deflecting system as claimed in claim 1, comprising hydraulically powered actuating means to extend, retract, adjust and support said bumper-like deflective assembly in any position desired by the operator of said vehicle.

3. A collision deflecting system as claimed in claim 2, comprising selective means to control the impact-absorbing and impact-resisting capacity of said system by regulating the hydraulic pressure in said hydraulic actuating means.

4. A collision deflecting system as claimed in claim 2, wherein said hydraulic means comprise in combination one double-acting hydraulic cylinder assembly strategically located and pivotally secured to suitable rigid structural member of said vehicle, while its piston-rod end is pivotally secured to said collision deflecting assembly in such a way whereby it will extend, retract, adjust and keep it in any degree of extention desired by the operator of said vehicle.

5. A collision deflecting system as claimed in claim 4, wherein said hydraulic cylinder is secured to said rigid structure of the vehicle in such manner whereby the inertia load of an impact against said deflective bumper-like assembly is transferred by it into said vehicle rigid structure at a point substantially back of its front-wheel axle line.

6. A collision deflecting system as claimed in claim 4, wherein said hydraulic means comprise plurality of double-acting hydraulic cylinders configured to work in unison as desired by the operator of said vehicle.

7. A collision deflecting system as claimed in claim 4, wherein said hydraulic system is augmented and assisted in its functions by rigid, auxiliary supporting means pivotally attached on one end to said rigid vehicle structure and on the other end pivotally attached to appropriate members of said bumper-like deflective assembly.

8. A collision deflecting system as claimed in claim 4, comprising operative and control means whereby said deflective assembly is automatically extended when said vehicle reaches predetermined forward speed, but is retractable only by manually operable controlling means when said vehicle is motionless.

9. A collision deflecting system as claimed in claim 4, comprising means whereby said deflective assembly, regardless of its configuration, its actuating and operational cycle and means of power used, may be manually locked in any desired position, and kept in said position during both driving and parking of said vehicle, until unlocked manually, at which time said system will return to its normal operational cycle.

10. A collision deflecting system as claimed in claim 1, comprising two rigid members which are pivotally, operably connected at their inboard ends by modified shaft means comprising modified roller means rotatably attached to said shaft, and disposed to protrude substantially from the outwardly contour of said juncture assembly in both extended and retracted position.

11. A collision deflecting system as claimed in claim 10, wherein the inboard end of only one of said rigid members is provided with said modified pivot shaft and roller means, so configured that it is slidably operable in an elongated, specially configured slot means disposed at the inboard end of the other rigid collision deflecting member.

12. A collision deflecting system as claimed in claim 10, wherein the inboard ends of both of said rigid members comprise elongated, specially configured slot means for cooperative, slidable engagement of said pivotal shaft and roller means assembly within said slots in unison.

13. A collision deflecting system as claimed in claim 10, wherein the outboard ends of said rigid members comprise modified shaft and roller means to slidably, pivotally and operably engage with a specially configured guiding means secured to said rigid forward structure of said vehicle, to permit extention, retraction and adjustment of said deflective assembly.

14. A collision deflecting system as claimed in claim 1, wherein said forwardly protruding apex of said deflecting members is positioned at the longitudinal center-line of said vehicle structure.

15. A collision deflecting system as claimed in claim 1, wherein said forwardly protruding apex of said deflecting members is positioned substantially outboard from the longitudinal center-line of said vehicle structure.

16. A collision deflecting assembly as claimed in claim 1, comprising plurality of bumper-like deflective members so configured that when in their retracted position they assume in their plan view configuration outward-facing outlines and contours which correspond with and are similar to and harmonious with the plan-view outlines and contours of adjacent exterior surfaces of said vehicle.

17. A collision deflecting system as claimed in claim 1, wherein said bumper-like assembly comprise two inboard and two outboard members, pivotally and operatively connected together and to said vehicle rigid structure in such a way than when said system is in the retracted position, the two outboard members are substantially in longitudinal relationship to said vehicle, with their rearwardly ends pivotally attached to said vehicle rigid structure and their forwardly ends pivotally, operatively attached to outboard ends of said inboard members, which are pivotally connected together at their inboard ends, thus disposing the two inboard members in substantially transverse relationship to said vehicle and forming with it substantially rectangular plan-view outline; while when being extended, the two outboard members pivot substantially inboard from their outboard anchor means and the two inboard members continue from their junctures with said outboard units in similar inboard inclination to form substantially angular plan-view outline of the assembly, with their central juncture extending substantially forwardly to form the apex for said deflection triggering sensor means.

18. A collision deflecting system as claimed in claim 1, wherein said extendible deflective assembly comprise a plurality of elongated, rigid members of unequal length, whereby the forward apex of said assembly is positioned substantially outboard from the longitudinal center-line of said vehicle.

19. A collision deflecting system as claimed in claim 1, wherein said roller-type impact-deflecting means located at a plurality of points along the outward-facing contour of said deflective assembly are configured of very hard, durable, non-collapsible and non-crushable material able to withstand the full impact of a collision against them without collapsing and deforming, so that they will remain rotatable in their housings even after the initial high impact against them.

20. A collision deflecting system as claimed in claim 19, wherein said rollers are permanently, rotatably installed in permanently lubricated and sealed housings configured into said rigid, bumper-like members of said deflector assembly whereby they will rotate only under predetermined oblique pressure against them.

21. A collision deflecting system as claimed in claim 20, wherein said roller housing means comprise modified sectional sleeve-type bushing means and permanent-type lubricants.

22. A collision deflecting system as claimed in claim 19, wherein said roller means are retained in their recessed housings by means of specially, configured flanged sections of the material through which they are protruding and which is pressed against them in such manner whereby they will rotate only under predetermined, external, oblique pressure against them.

23. A collision deflecting system as claimed in claim 19, wherein said roller means are retained in their recessed housings by means of locating and positioning bolt-type means which will keep said rollers noise-free and allow their rotation in said housings under predetermined oblique pressure against them, but will yield under severe collision impact against them, thus allowing the G-load of the impact to be transferred onto the concave-type walls of said housing means, forcing them to assume the function of a modified sleeve bearing for said roller means.

24. A collision deflecting system as claimed in claim 19, wherein said roller means are modified to be operatively installed along the rest of said vehicle exterior contour which is exposed to unwanted collision impact and is sufficiently rigid to sustain an oblique impact against it, said roller means to convert any oblique impact against them into an oblique glide against their adjacent surface, and in case where the gliding maneuver of said vehicle is already initiated, to continue said process of deflective glide against said colliding object.

25. A collision deflecting system as claimed in claim 4, wherein said rigid surfaces for said roller-means comprise supporting and reinforcing means incorporated into the basic structural configuration of said vehicle.

26. A collision deflecting system as claimed in claim 24, wherein said roller means are lubricated for life in their housings, said lubricant being retained within its confines and prevented from escaping by means of an elastic formed-in-place gasket which is held in its place by modified flanges of the adjacent sheet metal of said vehicle body.

27. A collision deflecting system as claimed in claim 19, wherein said roller means are retained in their recessed housings by means of viscous type of formed-in-place gasket material, applied in a bead-form circumscribing said roller means where they protrude from said adjacent surface, thus also sealing said lubricating agent within the assembly and keeping said roller means rattle-free; said bead-gasket configured to break its seal and allow said roller to rotate under severe oblique external pressure against it.

28. A collision deflecting system as claimed in claim 19, wherein said rollers are configured of hard, incompressible material encased in metal cylinders.

29. A collision deflecting system as claimed in claim 19, wherein said rollers are confibured of hard, incompressible, shatter-proof synthetic material.

30. A collision deflecting system as claimed in claim 1, wherein said skid-plate panels are configured to protect sides of said vehicle by being applied to especially reinforced exterior body sections on either side of said vehicle, at areas most likely to come into violent contact with any colliding object after it is deflected by said collision deflecting means into an oblique impact against either side of said vehicle body, and also to convert any, even minimally oblique impact against said skid panels into a deflective glancing glide by sliding along or peeling off from the surface they are attached to.

31. A collision deflecting system as claimed in claim 30, wherein said skid-plates are secured to chosen surfaces of said vehicle exterior by a coating of unique material possesing proper characteristics of long lasting yieldable adhesiveness and lubricating durability and which will hold said skid-plate panels securely and rigidly enough so they may be finished in the same fashion as the adjacent body surfaces of said vehicle.

32. A collision deflecting system as claimed in claim 30, wherein said skid-plate is produced by application of consecutive coats of proper materials possesing the desired qualities; with the bottom one acting as the yieldable adhesive-lubricant to yieldably hold the top, hard surfaced coating material onto the chosen surface.

33. A collision deflecting system as claimed in claim 30, wherein said skid-plate comprise plurality of applied coatings of proper materials applied directly on top of each other, with the bottom one acting as the lubricant-adhesive agent, and the top one, after drying, offering surface hard enough to be finished in the same manner as the adjacent surface of said vehicle, but crushable under impact, thus exposing the lubricated surface underneath.

34. A collision deflecting system as claimed in claim 30, wherein said skid-plate means comprise suitable type of synthetic materials in form of a precoated, ready-to-apply film and semi-rigid and rigid sheets, adapted for easy application to any desired area of said vehicle exterior and easy removal and replacement of them.

35. A collision deflecting system as claimed in claim 34, wherein said skid-plates, when used in conjunction with chrome plated areas of said deflector means, comprise rigid, clear synthetic material, molded to conform to surfaces they are to cover, and vacuum plated to match the finish of said deflector.

36. A collision deflecting system as claimed in claim 30 wherein said reinforced body panels comprise rigid channels and beams to absorb the kinetic load of a collision impact against them and to dissipate it into the widest possible area of said vehicle rigid structure.

* * * * *

UNITED STATES PATENT AND TRADEMARK OFFICE
CERTIFICATE OF CORRECTION

PATENT NO. : 3,997,209
DATED : December 14, 1976
INVENTOR(S) : John J. Chika

It is certified that error appears in the above-identified patent and that said Letters Patent is hereby corrected as shown below:

Column 3, line 39, "out" should read -- our --.

Signed and Sealed this

Eighteenth Day of June 1985

[SEAL]

Attest:

DONALD J. QUIGG

Attesting Officer     Acting Commissioner of Patents and Trademarks